US008157652B2

(12) United States Patent
Nguyen et al.

(10) Patent No.: US 8,157,652 B2
(45) Date of Patent: Apr. 17, 2012

(54) INTERACTIVE GAMING TABLE

(75) Inventors: Binh T. Nguyen, Reno, NV (US); Richard E. Michaelson, Reno, NV (US); Connie E. M. Olivas, Reno, NV (US); Craig A. Paulsen, Reno, NV (US)

(73) Assignee: IGT, Reno, NV (US)

(*) Notice: Subject to any disclaimer, the term of this patent is extended or adjusted under 35 U.S.C. 154(b) by 1530 days.

(21) Appl. No.: 11/558,866

(22) Filed: Nov. 10, 2006

(65) Prior Publication Data

US 2008/0113767 A1 May 15, 2008

(51) Int. Cl.
*G06F 17/00* (2006.01)
*G06F 19/00* (2011.01)

(52) U.S. Cl. ............... 463/42; 463/16; 463/25; 273/309

(58) Field of Classification Search .............. 463/11–13, 463/16, 25, 40–42; 273/292
See application file for complete search history.

(56) References Cited

U.S. PATENT DOCUMENTS

| | | | | |
|---|---|---|---|---|
| 5,586,936 | A * | 12/1996 | Bennett et al. | 463/25 |
| 5,613,912 | A | 3/1997 | Slater | |
| 5,651,548 | A | 7/1997 | French et al. | |
| 5,735,742 | A | 4/1998 | French | |
| 5,770,533 | A * | 6/1998 | Franchi | 463/42 |
| 5,781,647 | A | 7/1998 | Fishbine et al. | |
| 5,957,776 | A | 9/1999 | Hoehne | |
| 6,165,069 | A | 12/2000 | Sines et al. | |
| 6,179,291 | B1 | 1/2001 | Vancura | |
| 6,270,404 | B2 | 8/2001 | Sines et al. | |
| 6,299,534 | B1 | 10/2001 | Breeding et al. | |
| 6,313,871 | B1 | 11/2001 | Schubert | |
| 6,532,297 | B1 | 3/2003 | Lindquist | |
| 6,582,301 | B2 | 6/2003 | Hill | |
| 6,628,939 | B2 | 9/2003 | Paulsen | |
| 6,651,985 | B2 | 11/2003 | Sines et al. | |
| 6,659,866 | B2 * | 12/2003 | Frost et al. | 463/17 |
| 6,663,490 | B2 | 12/2003 | Soltys et al. | |
| 6,722,974 | B2 | 4/2004 | Sines et al. | |
| 6,745,887 | B2 | 6/2004 | Heidel et al. | |
| 6,848,994 | B1 | 2/2005 | Knust et al. | |
| D512,466 | S | 12/2005 | White et al. | |

(Continued)

OTHER PUBLICATIONS

International Search Report and Written Opinion from Application No. PCT/US2007/083670 dated Dec. 4, 2008.

(Continued)

*Primary Examiner* — Milap Shah
(74) *Attorney, Agent, or Firm* — Weaver Austin Villeneuve & Sampson LLP

(57) ABSTRACT

Interactive gaming tables and systems adapted to facilitate the automated administration of gaming table events are provided. Tables can have a playing surface, an outer circumference with active player positions, a slave controller for each active player position adapted to facilitate automated gaming activities, a master gaming table controller to synchronize communications and activities between slave controllers, access interfaces for communications with networked devices located away from the table, cameras and other tracking devices adapted to track gaming events at the table, and a specialized gaming table bolster distributed about the outer circumference. Bolster devices can include player friendly peripherals, including visual displays, speakers, open jacks, player tracking devices, and lights or other display elements to indicate table game statuses or the presence or absence of players. Tables can communicate with each other, a remote host, and/or player controlled auxiliary or hand-held wireless devices, which may be adapted for backbetting.

34 Claims, 6 Drawing Sheets

U.S. PATENT DOCUMENTS

| | | | | |
|---|---|---|---|---|
| 2002/0068635 | A1 | 6/2002 | Hill | |
| 2002/0090988 | A1 | 7/2002 | Frost et al. | |
| 2002/0147042 | A1 * | 10/2002 | Vuong et al. | 463/40 |
| 2002/0169021 | A1 | 11/2002 | Urie et al. | |
| 2003/0151198 | A1 * | 8/2003 | Parra et al. | 273/274 |
| 2004/0224777 | A1 * | 11/2004 | Smith et al. | 463/47 |
| 2005/0026680 | A1 | 2/2005 | Gururajan | |
| 2005/0049049 | A1 * | 3/2005 | Griswold et al. | 463/46 |
| 2005/0137005 | A1 | 6/2005 | Soltys et al. | |
| 2005/0164759 | A1 * | 7/2005 | Smith et al. | 463/11 |
| 2005/0215326 | A1 * | 9/2005 | Iosilevsky | 463/46 |
| 2006/0035707 | A1 * | 2/2006 | Nguyen et al. | 463/29 |
| 2006/0058091 | A1 * | 3/2006 | Crawford et al. | 463/13 |
| 2006/0084506 | A1 * | 4/2006 | Yoseloff et al. | 463/42 |
| 2006/0205508 | A1 * | 9/2006 | Green | 463/40 |
| 2008/0015030 | A1 * | 1/2008 | Baazov et al. | 463/42 |
| 2008/0096659 | A1 * | 4/2008 | Kreloff et al. | 463/39 |
| 2008/0113706 | A1 * | 5/2008 | O'Halloran | 463/16 |
| 2008/0214262 | A1 * | 9/2008 | Phillips et al. | 463/16 |
| 2009/0098932 | A1 * | 4/2009 | Longway | 463/22 |
| 2009/0104961 | A1 * | 4/2009 | Hamada et al. | 463/16 |
| 2010/0105485 | A1 * | 4/2010 | Kuhn | 463/47 |

OTHER PUBLICATIONS

U.S. Appl. No. 11/425,998.
U.S. Appl. No. 11/515,183.
U.S. Appl. No. 11/517,861.
U.S. Appl. No. 11/224,903.

* cited by examiner

INTERACTIVE GAMING TABLE

NOTICE OF SIMILAR APPLICATIONS

The present application contains subject matter similar to co-pending and commonly owned U.S. patent application Ser. Nos. 11/425,998, 11/515,183, and Ser. No. 11/517,861, respectively entitled "Progressive Table Game Bonusing Systems and Methods," "Intelligent Wireless Mobile Device for Use With Casino Gaming Table Systems" and "Casino Display Methods and Devices" each of which are incorporated herein by reference and for all purposes.

TECHNICAL FIELD

The present invention relates generally to table games within a gaming environment, and more specifically to specialized gaming tables having more functionality and system interconnectivity.

BACKGROUND

Casinos and other forms of gaming comprise a growing multi-billion dollar industry both domestically and abroad, with table games continuing to be an immensely popular form of gaming and a substantial source of revenue for gaming operators. Such table games are well known and can include, for example, poker, blackjack, baccarat, craps, roulette and other traditional standbys, as well as other more recently introduced games such as pai-gow, Carribean Stud, Spanish 21, and Let It Ride, among others. Under a typical gaming event at a gaming table, a player places a wager on a game, whereupon a winning may be paid to the player depending on the outcome of the game. As is generally known, a wager may involve the use of cash or one or more chips, markers or the like, as well as various forms of gestures or oral claims. The game itself may involve the use of, for example, one or more cards, dice, wheels, balls, tokens or the like, with the rules of the game and any payouts or pay tables being established prior to game play. As is also known, possible winnings may be paid in cash, credit, one or more chips, markers, or prizes, or by other forms of payouts. In addition to table games, other games within a casino or other gaming environment are also widely known. For instance, keno, bingo, sports books, and ticket drawings, among others, are all examples of wager-based games and other events that patrons may partake of within a casino or other gaming establishment.

Although standard fully manual gaming tables have been around for many years, gaming tables having more "intelligent" features are becoming increasingly popular. For example, many gaming tables now have automatic card shufflers, LCD screens, biometric identifiers, automated chip tracking devices, and even cameras adapted to track chips and/or playing cards, among various other items and devices. Many items and descriptions of gaming tables having such added items and devices can be found at, for example, U.S. Pat. Nos. D512,466; 5,613,912; 5,651,548; 5,735,742; 5,781,647; 5,957,776; 6,165,069; 6,179,291; 6,270,404; 6,299,534; 6,313,871; 6,532,297; 6,582,301; 6,651,985; 6,722,974; 6,745,887; 6,848,994; and 7,018,291, as well as U.S. Patent Application Publication Nos. 2002/0169021; 2002/0068635; 2005/0026680; 2005/0137005; and 20060058084, each of which is incorporated herein by reference, among many other varied references.

Such added items and devices certainly can add many desirable functions and features to a gaming table, although there are currently limits as to what may be accomplished. For example, many gaming table items and devices are designed to provide a benefit to the casino or gaming establishment, and are not particularly useful to a player and/or player friendly. Little to no player excitement or interest is derived from such items and devices. Also, many gaming table items and devices tend to operate in isolation from each other, with little to no communication between devices or any central comprehensive overview. In addition, there currently exists little to no communication from gaming table to gaming table within what could be called a multiple gaming table network. Finally, there are simply a finite number of functions and abilities provided by gaming table items and devices, with new such devices providing new functions and abilities still being desirable.

While existing systems and methods for providing gaming tables and hosting table games at such gaming tables have been adequate in the past, improvements are usually welcomed and encouraged. In light of the foregoing, it is desirable to provide an interactive gaming table, and in particular for such an interactive gaming table to comprise a more robust selection of automated gaming table items and devices, at least a portion of which are attractive and beneficial to players, and many or all of which are interconnected in a comprehensive centrally coordinated manner.

SUMMARY

It is an advantage of the present invention to provide gaming tables, in a gaming environment adapted to host wager based games, that include a more robust selection of automated gaming table items and devices that are interconnected in a comprehensive centrally coordinated manner. Many such automated gaming table items and devices are preferably attractive and beneficial to players as well as to the gaming operator, such that a more efficient and enjoyable table game experience can be had by all. This is accomplished in many embodiments by providing interactive gaming tables having various automated peripheral devices, many or all of which are coordinated and directly or indirectly controlled by a master gaming table processor.

According to several embodiments of the present invention, the disclosed devices, systems and methods include an interactive gaming table adapted for hosting table gaming events involving accepting wagers, playing table games based on the wagers and granting monetary awards based on the results of the table games. Such an interactive gaming table can include a first surface adapted for the play of one or more wager-based table games and an outer circumference adapted for the presence of one or more active players at the interactive gaming table, with this outer circumference having a plurality of active player positions or stations distributed thereabout. Added electronic devices can include a plurality of slave controller devices adapted to facilitate various table activities at the different active player positions, with each of the active player positions preferably including at least one dedicated said slave controller device. Also provided can be a master gaming table controller in communication with each of the slave controller devices, with such a master controller being adapted to control a plurality of interactive gaming table functions, and also adapted to synchronize communications and activities between the slave controller devices. One or more access interfaces can be provided, with such access interfaces being in communication with said master gaming table controller and adapted for communications with one or more networked devices located away from the interactive gaming table. Such access interfaces are preferably adapted for wireless communications. One or more gaming table tracking devices can also be provided in communication with the master gaming table controller and adapted to facilitate the tracking of one or more gaming events or transactions at the interactive gaming table. Such table tracking devices can include cameras, radio frequency identification ("RFID") chips and antenna, and/or other suitable tracking devices.

In many embodiments, an interactive gaming table can have at least one annunciator can be disposed thereupon, with such an annunciator or annunciators being adapted to indicate one or more status items regarding table game activities and/or the presence or absence of players at the interactive gaming table. Such table game activities can involve main table game activities, such as wagers, player turns or actions, dealer turns or actions, and game outcomes, as well as bonus games, player presence, player placement or chip status, and the like. An annunciator many be any of a number of lights, sound output devices such as speakers, signs, bezels or other indicators adapted to display a particular player or table status, as may be desired.

Such an annunciator might include a specialized gaming table bolster distributed about the outer circumference of the interactive gaming table can be provided. Such a specialized interactive gaming table bolster can include a plurality of bolster display devices adapted to indicate one or more status items regarding table game activities, the presence or absence of players, or both, at the interactive gaming table. Each active player position preferably includes a dedicated section of gaming table bolster. Each active player position can also include, either within the bolster or elsewhere at the player position, a touchscreen, such as an LCD touchscreen, in communication with a respective slave controller device, with such a touchscreen, a sound output device, a microphone, and a player tracking device adapted to read player identifying indicia, with each item preferably being adapted to display to or otherwise interact with an active player at the active player position. Player identifying indicia can include a player-tracking card. Control for each such player specific peripheral can reside with a respective slave controller device that is dedicated for a given active player position.

Added bolster elements can include a coin acceptor, bill acceptor, chip acceptor, ticket acceptor, ticket printer, biometric reader, one or more individualized access interfaces and/or one or more open jacks adapted to host player owned and pluggable electronic components. Such access interfaces can be wireless, may be generic to the entire interactive table rather than specific player stations, and/or can be adapted to facilitate communications with one or more handheld wireless devices located at or near said interactive gaming table. In some circumstances, the master gaming table controller can be adapted to administer automated backbetting on table games at the interactive gaming table via such a plurality of access interfaces, which may be wireless, such that backbetting can be facilitated through backbettor use of player controlled auxiliary devices, such as handheld wireless devices, located at or near the interactive gaming table.

Specialized bolster peripherals or items can also include one or more bolster display devices adapted to indicate one or more statuses at the interactive gaming table. Such bolster display devices can include a bolster light at each of the plurality of active player positions distributed about the outer circumference of the interactive gaming table. Such a bolster light can comprise a light that covers a small portion, at least half or all or substantially all of the bolster surface area for its respective active player position. Such a bolster light can be adapted to indicate whether its respective active player position is occupied by an active player or is open and available for a new player. Such a bolster light can also be adapted to indicate whether it is the turn of an active player at its respective active player position, and/or wither a winning or losing game or bonus outcome has occurred for an active player at its respective active player position. In order to facilitate such functionalities, the bolster light can be adapted to light up in a plurality of different colors, different patterns, or both, to indicate various gaming table statuses.

One or more open plug in jacks within the specialized bolster or otherwise located at one or more active player positions can be adapted to permit an active player to plug in a personal electronic device owned by the active player, such that the player owned personal electronic device can accept downloaded content from the interactive gaming table or system. Such downloaded content may comprise additional game related visual display items, sound display items, advertising and/or promotional content for presentation on the personal electronic device.

In various embodiments of the present invention, which may include some or all of the foregoing elements, an interactive table gaming system is provided. Such a system can include a plurality of interactive gaming tables such as those described above, as well as an interactive gaming table host server located remotely from one or more of the gaming tables and in direct or indirect communication with each of the interactive gaming tables. Such a host server can be adapted to synchronize coordinated gaming activities between at least two of the interactive gaming tables, with such activities including table game tournaments, networked table game bonuses and other networked gaming events. Communications can be had between the host server and various interactive gaming tables, as well as between interactive gaming tables themselves. Of course, added network communications can include those between gaming tables and various auxiliary devices, such as player controlled betting or backbetting devices.

In various further embodiments, methods of providing a networked gaming event at such an interactive gaming table are provided. Pertinent method steps can include providing a first interactive gaming table such as that disclosed above, establishing a communication connection between said at least one access interface at the interactive gaming table and a first networked device, sending instructions to a master gaming table controller at the table from such a first networked device via the established communication connection, presenting a gaming event at the interactive gaming table based at least in part on those sent instructions, awarding a prize or monetary payout to an active player at the interactive gaming table based on that gaming event, collecting automatically game event information from the play of table games at the interactive gaming table, establishing a second communication connection between an access interface at the interactive gaming table and a second networked device, and forwarding the collected game event information to the second networked device.

Such access interface or interfaces can be wireless, and networked devices can include a remotely located interactive gaming table host server, other interactive gaming table(s), and/or handheld wireless device(s). The sent instructions can include instructions for changing a display atop the gaming table playing surface from a first gaming formatted layout to a second different formatted gaming layout, with a further method step being to then change the display atop the first playing surface from the first gaming formatted layout to the second different formatted gaming layout, such that a different table game can be played at the interactive gaming table. In some embodiments, such instructions or other communications can be sent from the host server to a second interactive gaming table, which then relays the instructions or other communications to the first interactive gaming table.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive progressive bonusing systems and methods for table games. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Various advantages of the present invention include the introduction of an interactive gaming table that is more fully automated, providing added benefits to the gaming operator, and also having various automated and player friendly items and functionalities. Also provided is a interactive gaming table network adapted to provide interconnected table game activities and events, such that pit, casino, or area wide table game tournaments, bonuses and the like can be had. The foregoing and many other aspects of the present invention can be accomplished at least in part by providing various peripherals at the gaming table, a plurality of slave controllers adapted to manage discrete player positions or stations about the interactive gaming table, a master table gaming controller adapted to synchronize activities between the slave controllers and administer a variety of global interactive gaming table functions, and one or more network access interfaces, such as wireless interfaces, to enable the interactive gaming tables to communicate with each other and various other outside servers and devices.

The remainder of this detailed description shall continue with the description of an individual specialized interactive gaming table according to various embodiments of the present invention, and will then provide various embodiments and potential peripherals that can be included for a specialized interactive gaming table bolster. Various embodiments for a network involving a plurality of interconnected interactive gaming tables are then provided, after which an exemplary method of providing a gaming event across a plurality of networked interactive gaming tables is described.

Interactive Gaming Table

Figure 1:
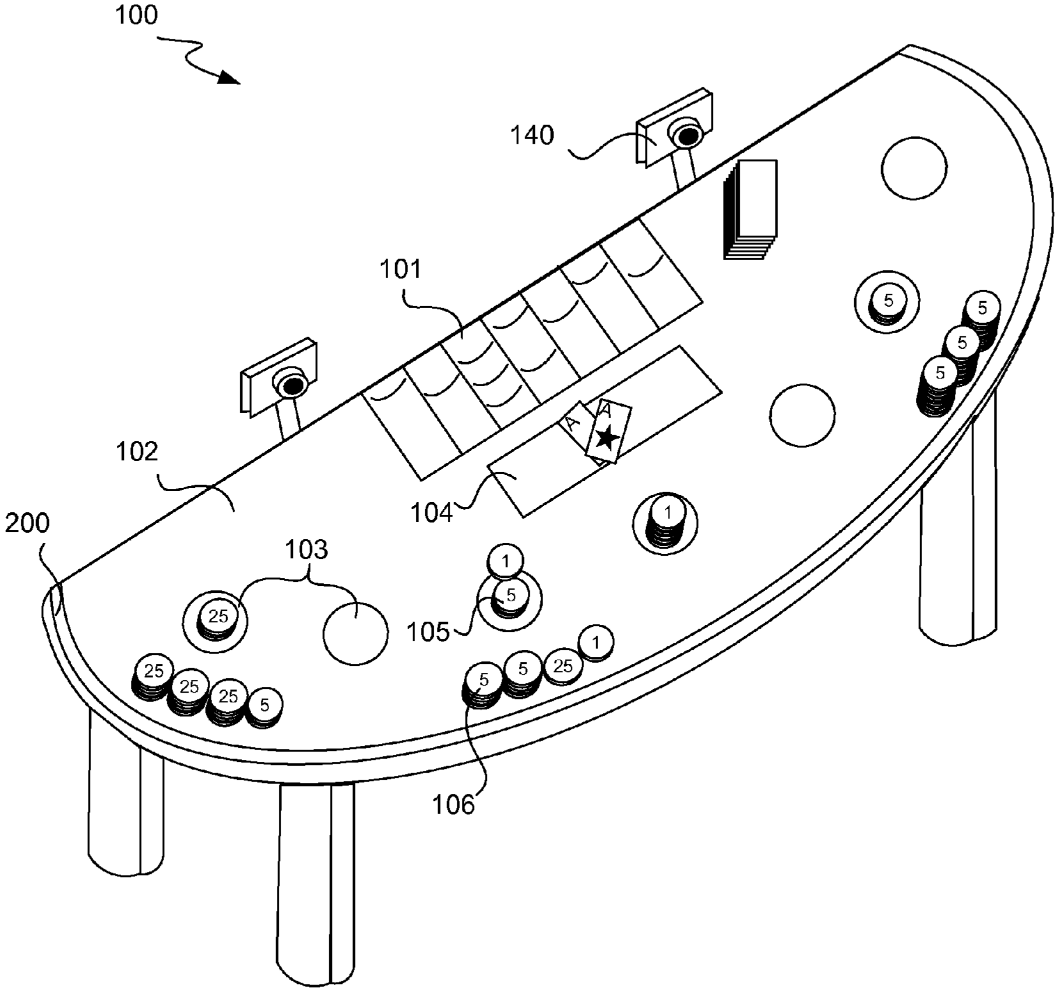
FIG. 1 illustrates in top perspective view an exemplary interactive gaming table according to one embodiment of the present invention.

Referring first to FIG. 1, an exemplary interactive gaming table 100 is shown in top perspective view. While interactive gaming table 100 can include multiple automated peripheral devices, items and features that might typically be found on a slot machine, video poker machine or other similar gaming machine, it will be understood that FIG. 1 is being provided solely for illustrative purposes, such that many such added peripherals are not shown in this general overview. Although interactive gaming table 100 has the general appearance of a blackjack table or a gaming table for a similarly distributed and played main table game, it will be readily appreciated that the gaming tables used in conjunction with the present invention can also be extended to other forms of gaming tables and even alternative gaming venues. As may be readily appreciated, the specialized interactive gaming table 100 depicted is particularly adapted to host any of a number of standard casino table games, such as blackjack, baccarat, pai-gow, Carribean Stud, Spanish 21, and Let It Ride, among others. Similar interactive gaming tables can be created with layouts as may be applicable for different types of gaming tables or alternative venues, such as, for example, a craps table layout, a roulette table layout, and/or a sports book counter or presentation, among other suitable gaming tables or venues.

Differences between interactive gaming table 100 and any other ordinary gaming table can include the presence of any of a number of suitable devices and items adapted for the automated tracking of wagers and other gaming activities and transactions at the interactive gaming table. While such transaction, wager and other gaming activity tracking can potentially be done manually, it is specifically contemplated that such tracking be at least partially automated. Such automated tracking of gaming activities and transactions might be accomplished through the use of numerous items, such as, for example, cameras and/or RFID chips and antennae.

As a more particular example, RFID based gaming chips can be in use at the table, as well as RFID reading devices and other related components, which may preferably be located beneath the gaming table or in other non-obtrusive locations. The use of such RFID gaming chips and reading devices is known, and various details regarding the use of RFID tags within gaming chips to facilitate gaming chip identification and tracking can be found at, for example, U.S. Pat. Nos. 5,651,548 and 5,735,742, as well as copending and commonly owned U.S. patent application Ser. No. 11/224,903, filed on Sep. 12, 2005, and entitled "Enhanced Gaming Chips and Table Game Security," each of which is incorporated by reference herein in its entirety and for all purposes.

Alternatively, the tracking of gaming chips, markers, cards, players and other items and activities at interactive gaming table 100 can be accomplished by way of cameras or other visual equipment, as well as various image processing and software tracking programs. Further details of exemplary visually based gaming chip tracking applications can generally be found at, for example, U.S. Pat. Nos. 5,781,647; 6,313,871; 6,532,297; and 6,663,490, each of which is also incorporated by reference herein in its entirety and for all purposes. In some embodiments, one or more cameras positioned at, within or about interactive gaming table 100 can be adapted to sense and/or record various gaming table statuses, such as the presence or absence of a player at a player station or position, and/or various player gestures. Such player gestures may include, for example, hand motions by the player to "hit" or take another card, or to "stay" or not take another card.

As a particular illustrative example, interactive gaming table 100 can be adapted for use with RFID based gaming chips and reading devices, although it will be readily understood that any other suitable wager and gaming activity tracking system may also be used. As such, gaming table 100 can have a chip tray 101 adapted to store a plurality of gaming chips, including RFID gaming chips, as well as a gaming surface such as upper surface 102 adapted for the play of games and various other gaming transactions involving gaming chips, cards, markers and the like. Various chip placement areas 103, 104 are distributed about the upper surface 102 of the interactive gaming table 100. Such chip placement areas can include bet or wager placement areas 103, as well as a cash for chips or other marker conversion area 104. Gaming chips 105, 106 of one or more denominations may also be located atop the upper surface 102 of the interactive gaming table 100, particularly during times of gaming activity at the table. For example, gaming chip 105 is a $5 chip that is subject to a current wager in a bet placement area, while gaming chip 106 is a $5 chip that is not subject to a current play or action at the gaming table.

As will be readily appreciated, gaming chips 105 and 106 may be identical or substantially similar, with the possible exception of RFID tags contained within or about the chips. Such RFID tags might be located at the gaming chips in various configurations, as detailed in previously noted U.S. Pat. Nos. 5,651,548 and 5,735,742, and U.S. patent application Ser. No. 11/224,903. In order to facilitate the automated or semi-automated tracking of gaming chips, and by extension wagers and other gaming activities at specialized interactive gaming table 100, one or more RFID readers (not shown) can be placed at various locations about the gaming table. One appropriately sized RFID reader for such an application might be, for example, the OEM 50 Read/Writer Module made by HID Corporation of Irvine, Calif., although any suitable RFID writer may be used. It will be readily appreciated that a number of RFID readers may be situated about the gaming table as may be suitable for the accurate reading of chips and wagers.

Interactive gaming table also preferably has any of a number of different kinds and types of status indicating annunciators, such as a specialized gaming table bolster 200 that extends along at least a portion of the outer circumference of the gaming table. As is generally known, a gaming table bolster can be provided for the comfort of players, and may have one or more player convenient aspects and items, such as a comfortable leather or cloth surface and one or more player cup holders. Such items and materials of construction may also be a part of specialized gaming table bolster 200, although added materials, such as plastics and metals, might also be present. Further exemplary details and interactive peripherals that can be included for specialized gaming table bolster 200 are provided below.

One advantage of specialized interactive gaming table 100 is the ability to sense the presence of active players and provide discernable displays or indicia as to whether any given player position or station is occupied by a player participating in wager based gaming events or is otherwise active at the gaming table. As noted above, one or more cameras 140 positioned at, within or about interactive gaming table 100 can be adapted to sense and/or record the mere presence or absence of a player at a player station or position. One motion sensing camera that can be adapted for such an application might be, for example, the WVC54GC Compact Wireless-G Internet Video Camera made by Linksys of Irvine, Calif., although any suitable motion detecting camera may be used. Alternative sensors adapted to detect the presence of an active player that may be used instead of or in conjunction with such cameras can include proximity sensors, motion sensors, thermal sensors, pressure sensors, card readers, biometric readers or any other suitable sensor adapted to detect the presence of a player. Another particular example of such a sensor could be, for example, the MS14A EagleEye Wireless Motion Sensor made by the X-10 Corporation of Kent, Wash. Such sensors may be embedded in the gaming table, such as within or about specialized bolster 200, and/or embedded in player seats or other suitable gaming table locations. As yet another possibility, pressure sensors embedded within each seat may be used to detect the presence of a player. Such a pressure sensor might be, for example, the ASDX015A24R model pressure transducer made by Honeywell International, Inc. of Morristown, N.J.

While the use of player detecting sensors, such as cameras, card readers, and seat based pressure sensors, might be expected to account for the detection of most all players that would be active at interactive gaming table 100, such sensors or combinations of sensors might not be entirely foolproof. Accordingly, it is also contemplated that one or more manual inputs be provided, with such manual inputs being located at a live dealer station, one or more of the active player stations or positions and/or at other locations that are readily accessible to casino personnel. In this manner, such manual inputs may be used to positively establish the presence or absence of a player at a given player station or position. As one example, the actions of a particularly fidgety player or a player that frequently leaves the table for a short time, such as to smoke, but wants to hold his or her seat, might cause havoc with the automated sensors attempting to establish whether or not an active player is present at the seat (i.e., player position) of that player. In such situations, the player, the table dealer, or other casino personnel could be permitted to press a button to indicate that that particular player position is occupied.

As part of the advantage of automatically detecting active players or otherwise designating that active players are present at interactive gaming table 100, and preferably any particular player location or station at the gaming table, one or more indicators or "annunciators" of such player presence or status can be employed. For example, one or more lights within specialized bolster 200 can be activated or deactivated depending upon player presence, player absence, or other player status at the gaming table or a given player position. In a preferred embodiment, different portions of specialized bolster 200 can be made to light up or turn off depending upon whether an active player is present at a given bolster section and playing at the gaming table. In addition, one or more regions of the playing surface 102 of interactive gaming table 100 can be made to light up or otherwise indicate a player status. Also, signs, sound output devices or additional lights might be used to indicated a game or player status at the table. Such annunciators can preferably be seen not only by those near the gaming table, but also by others located at some distance from the gaming table. In this manner, potential players and casino personnel can recognize even at a distance which gaming tables have open seats and which seats are open. As will be readily appreciated, such player status might not only indicate whether an active or live player is present at the gaming table, but might also involve a game status, such as whose turn it is and whether or not a player has won, lost, is in the lead, and so forth. Further details of such indicators are provided in greater detail below.

Figure 2A:
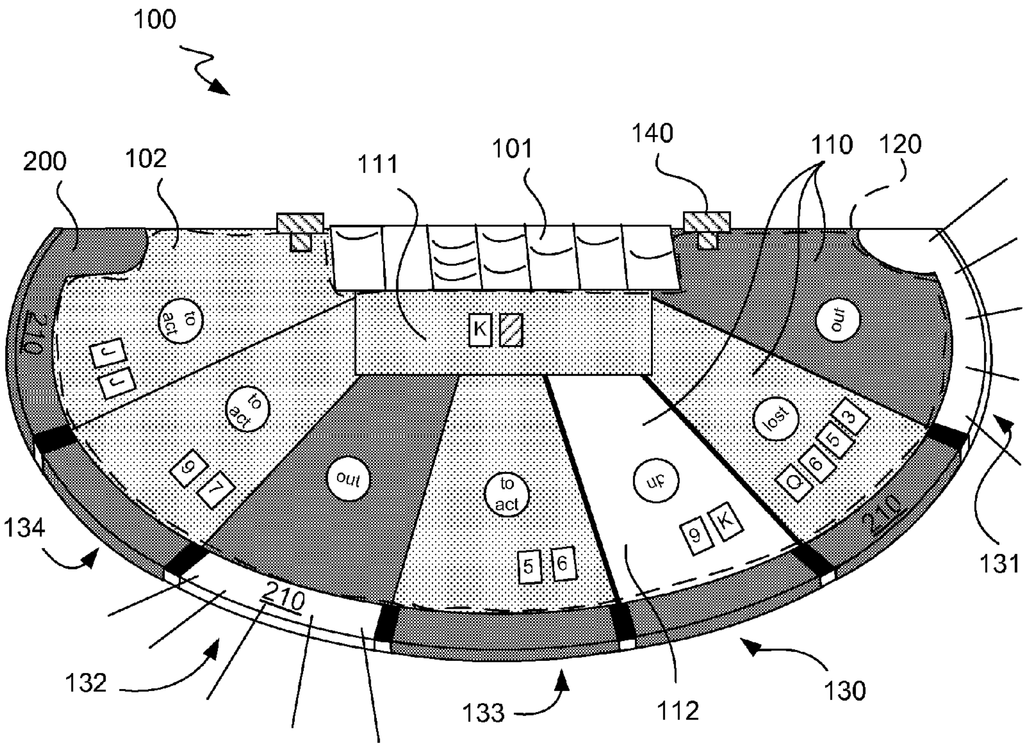
FIG. 2A illustrates in top plan view a more detailed rendition of the exemplary interactive gaming table of FIG. 1 according to one exemplary embodiment of the present invention.
Figure 2B:
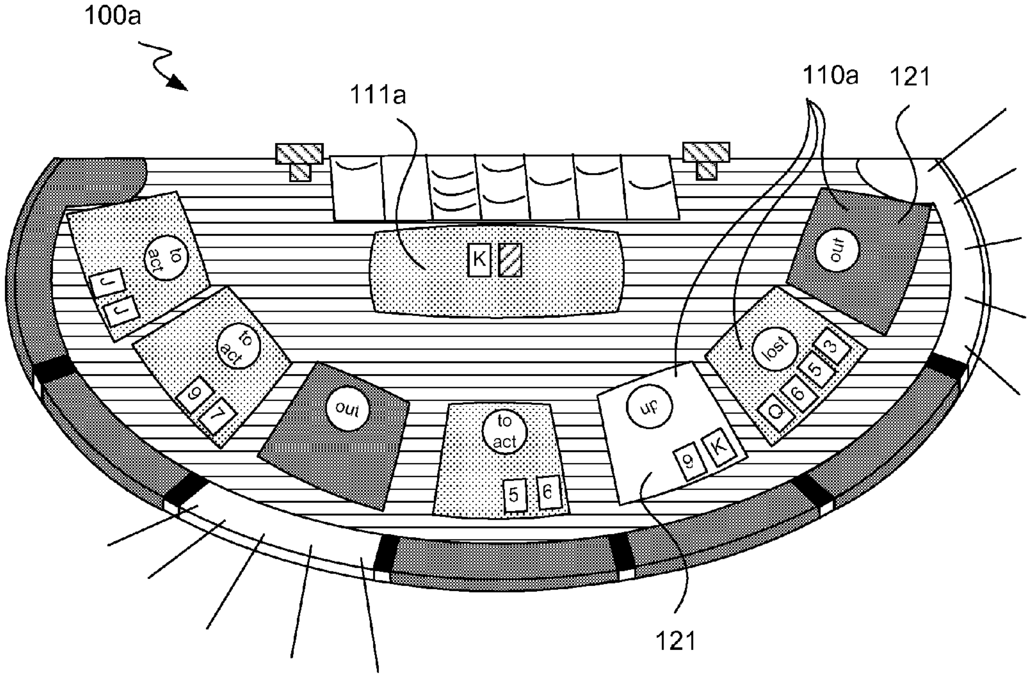
FIG. 2B illustrates in top plan view a more detailed rendition of the exemplary interactive gaming table of FIG. 1 according to an alternative exemplary embodiment of the present invention.

Turning now to FIGS. 2A and 2B, more detailed renditions of the interactive gaming table of FIG. 1 according to two exemplary embodiments of the present invention is illustrated in top plan view. As can be seen from both figures, interactive gaming table 100, 100*a* can be made to resemble half a pie that is split into "pie pieces" or sections 110, 110*a*, with each such pie piece or section corresponding to a player position or station. As shown, FIG. 2A illustrates interactive gaming table 100 as being split into full pie pieces 110, while FIG. 2B depicts interactive gaming table 100*a* as having partial pie pieces 110*a*. As will be readily appreciated, full pie pieces, partial pie pieces or other alternative layouts or sections might also be used without detracting from the spirit or scope of the invention. A dealer position or station, such as illustrated dealer positions 111 and 111*a*, may also be represented by such a pie piece, partial pie piece or alternative section.

In various embodiments, upper or playing surface 102 can include one or more displays 120, 121, 122 adapted for the play of table games on interactive gaming table 100. Such displays can include a liquid crystal display ("LCD"), a plasma display, a flat panel display, or any other display suitable for displaying events on one or more gaming table surfaces or facets. In some embodiments, the entire playing surface 102 can be one large LCD or plasma display, such as full LCD playing surface 120 in FIG. 2A. Various examples and further details for such a gaming table surface display are disclosed in commonly assigned and copending U.S. patent application Ser. No. 11/517,861, by Underdahl, et al., entitled "Casino Display Methods and Devices," which is incorporated by reference herein in its entirety and for all purposes. Such a display could be one that is commonly produced by a display manufacturer, or could be a customized display built specifically for the shape of the gaming table. One display that can be adapted for such an application might be, for example, the PX350 flat panel display made by Smart, Technologies, Inc. of Calgary, Canada. Alternatively, some portion of playing surface 102 can comprise multiple smaller displays, such as partial LCD playing surfaces 121 and 122 in FIG. 2B. Other configurations of displays embedded into playing surfaces may also be used, as will be readily appreciated. In any such instance, such playing surface displays can be used to project a table game layout onto the surface of the gaming table, such as a blackjack layout. Such a layout might then be changed by a casino operator as desired, as set forth in greater detail below.

As noted above, each piece or alternative player section atop a display playing surface can be programmed to light up for a player for a particular player status, such as when it is the turn of the player at a relevant player section or station, for a winning outcome for a relevant player or position, a bonus eligibility notice or win, or some other distinguishing event for the respective player. Referencing FIG. 2A for one particular example, "pie piece" 112 within full display playing surface 120 could light up when it is the turn to act for the respective player at player station 130. Taking this example a step further, the full display playing surface 120 can be programmed to project a normal table game layout, such as a blackjack layout, across the full surface of the gaming table. As shown, the display surface pie piece for each player section might be darkened or even blacked out for any player section where no live player is present, such as at player stations or positions 131 and 132. Also, the relevant display surface pie piece or pieces could remain at a normalized lit level for active players who are not up to act, such as at player positions 133 and 134, and could be brightened, outlined or enhanced in some manner to indicate whose turn it is to act, such as at player station 130. Further indicators that might show which player (or dealer) is to act next could include arrows, a carat, or a bouncing dot or animated character that proceeds around the table to indicate turn status.

Furthermore, as detailed herein, the specialized bolster 200 may have bolster sections that can be darkened or lit up according to whether not an active player is present at a given player station or position. Referring again to FIG. 2A, it can be seen that there are exactly seven player stations 110 at interactive gaming table 100, and that each player station has its own separate specialized bolster section 210. Of course, there may be fewer or more designated player stations at an interactive gaming table, and there may also be more than one bolster section per player station, as may be desired. In this particular illustrative example, all player stations at interactive gaming table 100 have active players present, except for player stations or positions 131 and 132. Accordingly, the bolster section at player positions 131 and 132 are illuminated to indicate to everyone that these particular player stations are open for new active players to participate at interactive gaming table 100. Since players are present at each of the other player positions, the bolster sections 210 for each of these other player positions are not illuminated in this example. In detailed variations, specialized bolster 200 may be lit up differently to indicate a preferred player position or status, such as a golden color for a "Gold Card" member.

As noted above, one or cameras can be used to read and track playing cards, dice, chips, markers, tokens and the like. Player biometrics might also be read, such as facial features that are then used in conjunction with facial recognition software, such as for player tracking or cheater identification purposes. Such facial recognition hardware and software might be part of a system provided or supported by, for example, the Bio Face Recognition System by Security Lab, Ltd. of New York, N.Y. Such cameras might also be used to read, track and even interpret gestures of players, such as to "hit" a new card or "stay" and take no further cards. For such purposes, one or more wide-angle cameras 140 such as the Model RPU-C1833 Chameleon Eye Camera made by Sony Corporation of Tokyo, Japan, might be positioned about interactive gaming table 100 to capture and track such player motion indicators. As is generally known, motion detection cameras and movement interpretation software can be used to interpret many different motions, particularly where such motions are sweeping or otherwise quite distinguishable. Such technology is offered by, for example, GestureTek, Inc. of Toronto, Canada, among others. Various noted and acceptable player motions or gestures for "hit" or "stay" could be programmed into the relevant software, such that the computing system at interactive gaming table 100 can interpret many player motions for these activities. In some embodiments, microphones at the gaming table and voice recognition software might also be used in a similar manner.

In addition to the various tracking cameras that might be used, such as wide angle cameras 140 and/or the various types of tracking cameras disclosed in the outside references incorporated herein, one or more added overhead cameras (not shown) can be focused on the activities of interactive gaming table 100 and adapted to show such activities. Statuses such as who is winning, what players are active, whose turn it is, what cards are visible, which players have what chips, and other factors of interest might then be displayed. Such displays could be made to the players at the gaming table, at a location nearby the gaming table, elsewhere within the gaming establishment, such as to remotely located personnel, or to viewers on a live or recorded program, such as for a televised poker tournament.

Figure 3:
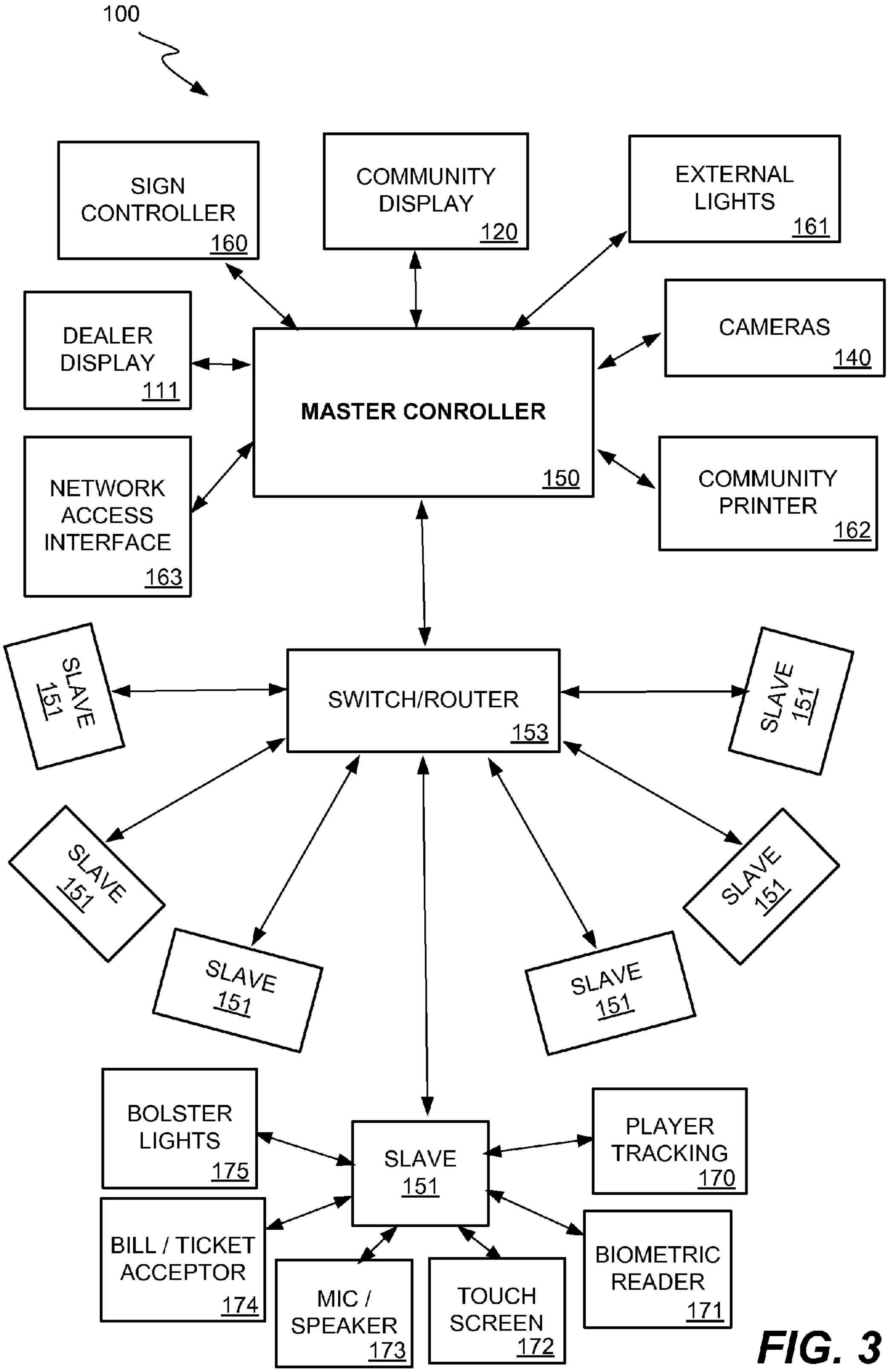
FIG. 3 illustrates in block diagram format an overview of the entire electronic infrastructure of the exemplary interactive gaming table of FIG. 1 according to one embodiment of the present invention.

Moving next to FIG. 3 an overview of the entire electronic infrastructure of the exemplary interactive gaming table of FIG. 1 according to one embodiment of the present invention is provided in block diagram format. As might be appreciated, one or more microprocessors and other electronic equipment are preferably present at interactive gaming table 100 in order to process the myriad peripherals, devices and functions present. In various embodiments, a master gaming table controller 150 can be adapted to the primary microprocessor or control device at the interactive gaming table. One device that could serve as such a master table gaming controller could be, for example, the BOXDG965RYCK ATX Motherboard made by Intel, Corporation of Santa Clara, Calif., although it will be appreciated that a wide variety of alternative suitable primary processing boards and components could be used for such an item. Such a master gaming table controller can be responsible for controlling and coordinating functions and efforts between a plurality of slave controllers 151 as well as having control of global table functions. Such slave controllers 151 might each be, for example, a Lifebook© P7120 Notebook made by Fujitsu, Ltd. of Tokyo, Japan, although any suitable processing device that can be adapted as a slave device may be used. Master gaming table controller 150 might be adapted to drive any playing surface LCDs, such as a community display (i.e., LCD 120), table signage 160, spotlights or external lights 161, cameras 140, a community printer 162, one or more network access interfaces 163 and other items used to facilitate communications between the gaming table and any outside networked devices or components, among other items. A wide variety of suitable items may be used for the various peripherals listed here, with one such example being an Ithaca iTherm 280 model thermal printer made by TransAct Technologies, Inc. of Wallingford, Conn. as printer 162.

In addition to the synchronization of individual slave controllers, master table game controller 150 can also be responsible for oversight and coordination of communications to and between various table devices, control of a progressive table bonus for the interactive gaming table, and controls for the various tracking devices at the gaming table, such as tracking cameras and/or RFID devices. Further functions can include the coordination of downloads, signage, player positions, table traffic and play or action sequences, as well as control of one or more communications access interfaces, such as a wireless antenna that enables wireless communication with other interactive tables and/or a remote interactive gaming table server. Master gaming table controller 150 can also be adapted to keep an audit trail of a variety of table events and transactions, and can also be adapted to send such audit trail information to the interactive gaming table server or some other remote server. Such audit information might include, for example, financial transactions such as buy-ins or color-ups, game outcomes, and various player tracking items, such as time in and out, time spent, amounts wagered and amounts won or lost.

Each slave controller 151 is preferably connected to master table gaming controller 150 by a switch or routing device 153, such as an Ethernet router. Such a router might be, for example, the Instant Broadband EtherFast Cable/DSL Firewall Router, Part No. BEFSX41, made by Linksys of Irvine, Calif., although any suitable routing device may be used. Such a device can help to control and coordinate efforts between the various slave devices, such as by indicating to a given slave controller when action or input is requested of a given player station controlled by that given slave controller. In various embodiments, a plurality of slave controllers 151 can be implemented at each player position at the interactive gaming table in order to oversee and coordinate control of functions at each player station. For example, there may be one dedicated slave controller 151 dedicated for every player position or station. Of course, more than one slave controller may be provided for each player position, or alternatively, one slave controller may be adapted to control several player stations.

Optionally, an additional slave controller (not shown) can be added to provide similar oversight and control of a live dealer and/or virtual dealer station. Each slave controller 151 can control with a wide variety of peripheral devices and items that are associated with its respective player or dealer station, such as, for example, player card readers or other player tracking devices 170, fingerprint or other biometric readers 171, individual player touchscreens or other displays 172, ticket acceptors, microphones, speakers and/or other sound output devices 173, bill acceptors, ticket acceptors, coin acceptors and/or other credit accepting devices 174, and individual bolster lights 175, among other various peripherals and devices. It will be readily appreciated that not all peripherals listed here need be used in association with a given slave controller or player station, that other peripherals not listed may be used, and that different player stations or slave devices may control different types and numbers of peripherals, as may be desired. Furthermore, while peripheral devices and items have been illustrated for one exemplary slave controller, it will be understood that any or all slave devices may have identical or similar arrangements.

In some embodiments, the interactive gaming table can be cashless and/or cardless, such that tickets, player tracking cards, smart cards, credit cards, and/or player biometrics can be used to facilitate cashless play, such as by utilizing cashless tickets or obtaining biometric player information and then linking players to remotely administered player accounts. Such embodiments can make use of one or more communications access interfaces, such as a wireless antenna (not shown). Of course, wired interfaces may also be used, as may be desired. Further details of wireless access interfaces and communications from and between interactive gaming tables within an overall interactive gaming table network are provided in greater detail below.

Specialized Gaming Table Bolster

As noted above, interactive gaming table 100 can have a wide variety of different annunciators can be disposed within or thereupon, with such an annunciator or annunciators being adapted to indicate one or more status items regarding table game activities and/or the presence or absence of players at the interactive gaming table. Such table game activities can involve main table game activities, such as the placement of wagers, the turn status or action of a player or dealer, game outcomes, bonus game statuses and outcomes, chip status, and so forth. In addition, the simple presence or absence of a player can be indicated by such an annunciator, which can be any of a number of lights, speakers, signs, bezels or other indicators adapted to display a particular player or table status, as may be desired. A large electronic sign above the table, for example, could be an annunciator used to indicate the type of game, the betting minimums or limits, the number of players permitted, and the number of players at the table. While a virtual infinite number of possibilities exist for different annunciators that can be used to indicate various table, game and player statuses, a particular type of annunciator that might be used, both with and without other possible annunciators, can be one or more bolster lights within a specialized gaming table bolster.

Figure 4:
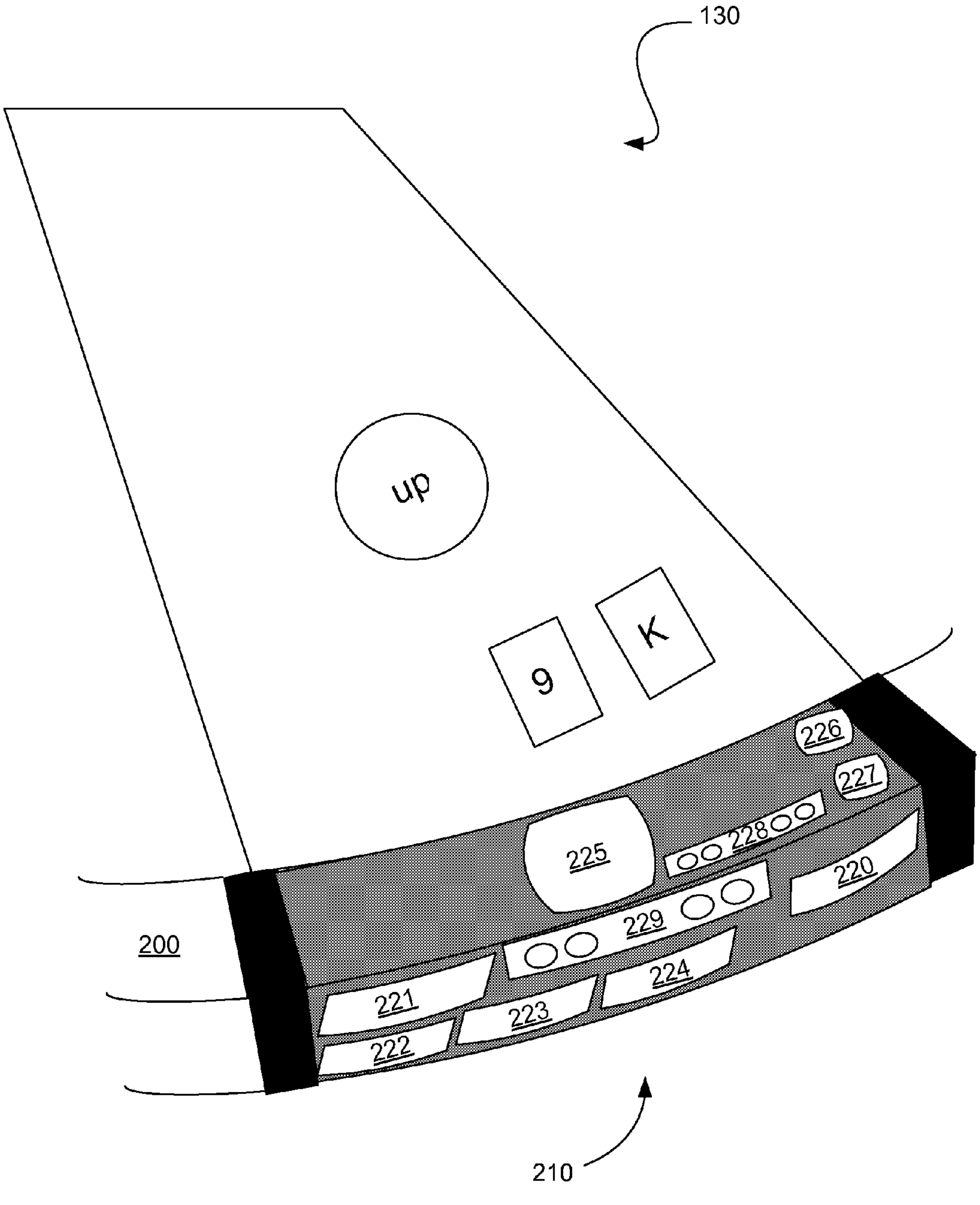
FIG. 4 illustrates in top plan view a more detailed rendition of an active player station according to one exemplary embodiment of the present invention.

FIG. 4 illustrates in top plan view a more detailed rendition of an active player station 130 according to one exemplary embodiment of the present invention. As can be seen, specialized gaming table bolster 200 has a particular bolster section 210 that correlates to and is a part of player station 130. Specialized gaming table bolster 200 preferably houses a variety of player friendly lights, indicators and peripheral devices, with many such items being included at each player station. Such peripherals can include a player tracking card reader 220, a chip acceptor 221, a bill acceptor 222, a ticket acceptor 223, a ticket printer 224, an individual LCD touchscreen 225, a sound output device 226, a microphone 227, a button panel having various input buttons 228 and player accessible plug-in ports 229 adapted to support further plug and play devices. Functions for such devices are generally understood, such as the ability to read a player tracking card at card reader 220, or accept a monetary bill at bill acceptor 222. Alternative devices might also be utilized, such as, for example, a reader adapted to read other forms of player identifying indicia in addition to or rather than player tracking card reader 220. Examples for such alternative devices could include a biometric reader or an RFID reader adapted to read a player specific RFID embedded item, such as a charm or keyfob. Further, cards other than player tracking cards might also be usable and read at such a gaming table, with such cards including smart cards, debit cards, credit cards and other forms of identification and/or credit specific to individual players.

Additional items not shown might also be included as part of a given player or dealer specific bolster section, as desired by a given table manufacturer or gaming operator. Examples could include not only the biometric or RFID readers noted above, but also coin acceptors, bezels, barcode readers adapted to read barcodes on tickets and other barcode bearing items, lights and other player friendly items. Another example of such an item can be a handwriting interface to allow for handwritten player input, such as via a touchscreen and stylus. Further, one or more communications access interfaces could be provided for each player and/or dealer station. In the event that such access interfaces are to be provided for each player station, wireless access interfaces may be preferred. By having wireless access interfaces at each player position or station, players may be allowed to participate in backbetting at the table, as set forth in greater detail below.

Additional functions might also be used for the various peripherals and items that can be built into any given player bolster section 210. For example, input buttons 228 can be adapted not only to allow player input for the play of games, but also to enable the player to order playing chips or markers, change, food, drink, cigarettes, and also to permit contacts with a hotel front desk, concierge and/or restaurants, such as to make dinner reservations. One or more player accessible ports 229 can support providing or downloading content or general information to a personal iPod, cell phone, laptop or other personal device owned by a player. The interactive gaming table can then provide content to the personal device of the player, such that the overall player experience is enhanced and more enjoyable. Such content that may be provided to personal electronic devices via player accessible port 229 can include, for example, additional game displays, game sounds, game or bonusing information, music, movie clips, game or casino themes, hotel or restaurant information, and advertisements and other promotional materials, among other items.

In addition to the various player friendly and interactive peripherals noted above, it may be recalled that various lights can also be embedded in bezels and/or bolsters about and around the gaming table. Such embedded visual indicators can be an attractive feature for promotional purposes, such as to production companies involved with televising poker tournaments. In various embodiments, the entire bolster 200 can be lit in bright colors at any given time. Alternatively, only one or more bolster sections 210 can be lit, with lit status and/or colors indicating a number of possible items for the relevant player seated at that bolster section. Different colors and light intensities may be used in order to create a more vibrant and festive display, as may be appropriate. For example, where an active player at the interactive gaming table hits a major bonus, the entire bolster 200 can light up in bright lights, with especially bright lights or differentiating colors being present at the bolster section 210 in front of the winning player. In addition, one or more portions of a full LCD playing surface 120 can be coordinated with the bolster lights to provide a comprehensive display, such as for a large bonus win or tournament finish.

In order to provide for the many vibrant variations of lights that might be displayed from bolster 200, and in order for at least some of such variations to be visible at a distance from interactive gaming table 100, it is specifically contemplated that all, most, half, or at least some relevant and substantial portion of the bolster or relevant bolster section be available for being lit up for such annunciating purposes. For example, where it is desirable that the different bolster sections 210 of bolster 200 be used to indicate the absence or presence of active players at the gaming table, a default setting for a player active bolster section 210 could be all bolster lights off, while a default setting for a seat empty bolster section could be a prevalent bright green light across the relevant player bolster section 210. For such a prevalent bright green light to be readily visible from several tables away, or even far across the gaming floor, it may be preferable to have a bright green light that covers or spans substantially all of the bolster surface area for its respective player bolster section 210. Alternatively, a light that covers most all, half or at least some relevant clearly visible portion of the bolster may be used.

As noted above, various bolster sections 210 may be lit up differently for different players, such as to indicate a preferred player position or status. For players that are members of a "Player's Club" or other similar player rewards program, separate specialized colors might be used. In some embodiments, such player might be permitted to personalize the bolster light colors that are used for them. For example, while regular players might only see standard colors and light intensities, Gold Club, Players Club, VIPs, employees, and/or other special players might have separate colors and/or a choice of such colors. So, while a bezel light might be red, dark green or grey for the various game statuses and conditions of an ordinary player, a Gold club member might prefer that his or her bezel lights be gold, pink, blue, orange and so forth for the same statuses and conditions. Where functions are important to the overall table, different shades of a similar color might be used, so as not to confuse other players or casino personnel. For example, if a bright white color bezel is to be used to show which player the game action has shifted to, a preferred player may elect for his or her lit bezel to be beige or bright yellow in the same type of game situation. As another example, where a red bezel might indicate a loss or negative result for a regular player, a pink or red and white polka dotted bezel might be selectable for a preferred player. Such preferred player status and eligibility for alternative color selections might be tracked by a player tracking card or account.

Further provisions for preferred players or VIPs might also be available. For example, sounds might be different for such players, as well as bolster colors. As in the case of the bolster colors, such sounds may be player selectable in some cases. For example, where an ordinary player may hear a "buzz" sound if no bonus is won, a preferred player might elect to hear a sound clip of a favorite movie character saying "We'll get them next time!" Or, where an ordinary player might hear a bell or chime indicating a win, a preferred player might have a clip from the song "Celebration" played for a similar win. Other items to differentiate preferred players from non-preferred players might also be used, with such other items including, for example, specialized strobe lights or spotlights, such as where the preferred player might be a celebrity and is willing to be a focus of attention for promotional purposes. Such items for preferred players, celebrities or VIPs might be used on occasion for regular players too, such as in the case of a big win or other outstanding occurrence, where different color bezel lights, sounds and/or focused spotlights might be appropriate.

As noted above, player position or station can be provided with a player LCD touchscreen, microphone and speaker or other sound output device. Such items may be provided at or within a specialized bolster section 210, or can be located elsewhere within or about the player position. For example, separate player LCD touchscreens could be replaced by one large LCD playing surface 120 that is also adapted for touchscreen functionality in front of each player. By providing such player specific input and output items, each player may be allowed to interact with other players, a dealer, a host and/or one or more other entities. Such other players, dealers, hosts and other entities can be real live persons and/or virtual computer controller personalities. Rather than a virtual dealer, a real live host can be stationed where a regular dealer would normally stand. Such a live host could then interact with a "community display" at the interactive gaming table that displays game relevant information. This community display can be positioned at the dealer position and viewable by all players. Alternatively, such a community display might be provided upright behind a dealer position.

Separate player touchscreens and/or other components at a player station at the interactive gaming table might also be used to facilitate a variety of additional player friendly features and functions, particularly with respect to a player tracking account of the subject player. For example, a player at the interactive gaming table might be able to access player tracking account information and view such information on the separate player screen at the table. Information that could be accessed by the player might include player tracking ID and account information, game rules, instructions and examples for the game currently being played at the gaming table, various scheduled events and show times for venues at or associated with the casino, and general or directed advertising, among other informational items. Functions and services that could be provided to the player via such an individualized player touchscreen interface at the interactive gaming table might include, for example, options to redeem prizes or comps, which may include player tracking points or credits, the ability to make restaurant, hotel or entertainment reservations, the ability to participate in various casino promotions, requests for drinks or other services, the ability to register for a player loyalty program via the player screen, and the ability to communicate with other players at other such screens, such as by "instant messaging." Further features that can be provided to a player at a separate player station can include options to receive credit and/or transfer funds, such as through a credit card or player account card, as well as the ability to play alternative or bonus games on the display, with such alternative or bonus games being potentially separate and distinct from the table game that is being played on the interactive gaming table.

As will be readily appreciated, one or more of the various items listed above for potential inclusion into each player station might instead be provided at only one location on interactive gaming table 100, such as at a dealer station 111. Such items might include, for example, a ticket printer, player tracking card or other player indicia reader, speaker, or other any other item that a table manufacturer or gaming operator may not wish to have multiples of at a given table.

Networked Interactive Gaming Tables and Systems

Figure 5:
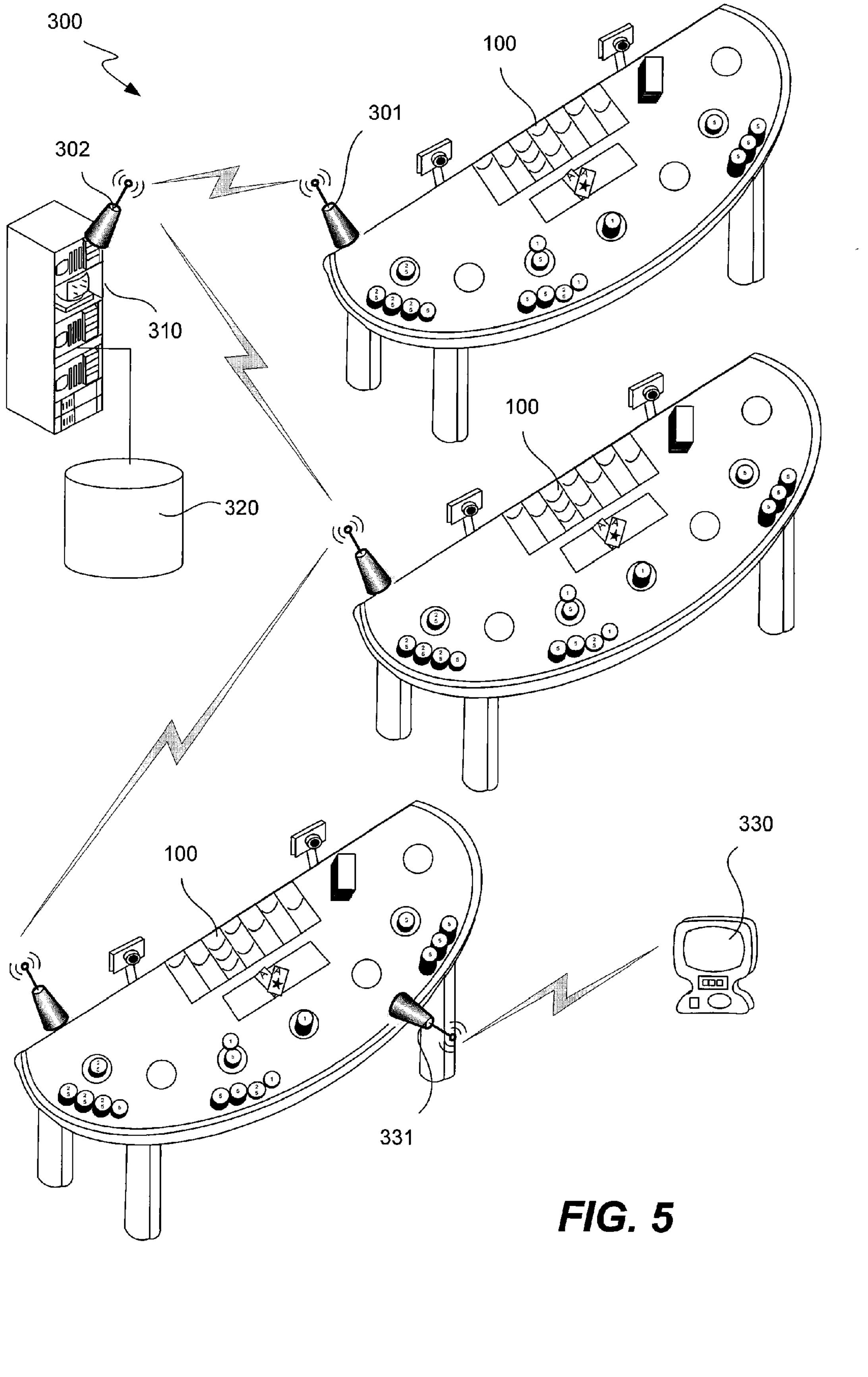
FIG. 5 illustrates in block diagram format an exemplary network infrastructure adapted to support to a system of interactive gaming tables according to one embodiment of the present invention.

Continuing on to FIG. 5, an exemplary network infrastructure adapted to support to a system of interactive gaming tables according to one embodiment of the present invention is illustrated in block diagram format. Interactive gaming table system or network 300 can include a plurality of interactive gaming tables 100, such as any suitable interactive gaming table embodiment disclosed above. In particular, wireless access interfaces 301 can be provided at each interactive gaming table 100 to accommodate wireless devices and generally permit communications between interactive gaming tables. Such inter-table communications can be used to network gaming tables. It will be understood that while wireless communications may be preferred, such table networking may also be done on a wired basis, such as by connections between tables and a host via wires underneath carpeting and/or other suitable wiring locations.

Interactive gaming table system 300 can include an interactive gaming table host server 310 that can be located remotely from one or more of the member interactive gaming tables 100. Such a host server 310 can be in direct or indirect communication with each of the interactive gaming tables, and is preferably adapted to synchronize coordinated gaming activities for and between tables. For example, the automated initiation and management of multi-table tournaments, such as blackjack or poker tournaments, can be facilitated through the use of host server 310. In addition, host server 310 can be utilized for player tracking, game tracking and game auditing purposes. Accordingly, a system database may be in communication with and controlled by host server 310.

Various programmable items can be administered from host server 310 and/or associated database 320. Such programmable items can be retrieved from database 320, downloaded from host server 310 to one or more interactive gaming tables 310, and can substantially resemble the types of server based gaming that are becoming available for gaming machines. For example, various gaming table layouts for interactive gaming tables having a full LCD or other display playing surface 120 can be stored at host server 310 and/or database 320 and then sent to individual gaming tables for use at those gaming tables. In systems having such capabilities, one or more casino personnel may choose to change all blackjack tables at one area of a pit or casino floor to pai-gow poker or Let It Ride tables. A simple input or command to the host server 310 could then result in the displayed layout at the desired tables being changed from blackjack to the new format.

In further embodiments, such reconfiguration of tables may be automated to some degree. For example, where system software is adapted to make changes at given times or for other triggering factors, such changes to gaming table layouts can be made automatically. Such triggering factors might also include, for example, outputs from automated tracking software adapted to analyze casino floor trends, such that the right numbers, types and denominations of tables are present on the casino floor at any given time, with little to no manual intervention needed on the part of casino personnel or management.

At least one wireless access interface 301 at each interactive gaming table can be adapted such that inter-table communications are possible. Communications from wireless access interface 301 might also be made between interactive gaming table 100 and host server 310. Accordingly, host server 310 might also have its own wireless access interface 302 for such communications. Where inter-table communications are enabled, such as between access interfaces from table to table, it may be unnecessary from host server 310 to communicate directly with each and every interactive gaming table 100 in the network or system. Rather, host server 310 might be made to communicate with one table or some subset of tables, so long as communications could then be relayed along from table to table such that most or all tables can receive communications from the host server indirectly. In lieu of having even one wireless connection from a host server to an interactive gaming table, one or more wired connections may also be provided. As still another alternative, host server 310 may have a wired connection to a standalone wired-to-wireless access point (not shown), from which wireless connections may then be made to one or more interactive gaming tables 100, as shown.

In various embodiments, one or more auxiliary devices 330 adapted to accept player input may be provided. Such player controlled auxiliary devices can be wireless handheld devices, and details for such a handheld device can be found at, for example, U.S. Pat. No. 6,628,939 entitled “Personal Gaming Device,” which reference is incorporated herein by reference and for all purposes. While wireless handheld devices and communications may be preferred, it is also contemplated that such a handheld device also be made available via wired connections, such as by a coiled cord, to prevent players from walking away from an interactive gaming table with such a handheld device. Player input on such a handheld device might be input regarding gaming activities at an interactive gaming tables, such as game play information or input. Wireless connections between such an auxiliary device 330 and a given interactive gaming table 100 might be made via wireless access interface 301 and/or one or more additional wireless access interfaces 331 at the table. As noted above, such additional wireless access interfaces may be placed at specific player and/or dealer positions or stations, such that a player using a handheld wireless auxiliary device 330 might be able to participate in a wager-based table game at the interactive gaming table 100. In some embodiments, more than one wireless access interface may be provided per single player station. Of course, it is preferable that a player uses such a handheld wireless device when the device is located at or near a respective interactive gaming table, such that adequate reception may be ensured. Alternatively, communications may be made over a hard-wired connection between the interactive gaming table 100 and the auxiliary device 330, such as by a tethered and coiled telephone type cord.

Such player participation may be as an active and primary player making the actual main bets and plays at a given player position. Alternatively, a player using an auxiliary device 330 might use such a device to make backbetting plays at the interactive gaming table. As is generally known, some forms of table gaming permit players to make back bets or side bets on or with primary players that are playing table games at a gaming table. Such forms of table game play are known to be quite popular within Asian communities and for Asian-based table games, such as pai-gow. As will be generally appreciated, players who are not primary active players at the gaming table, but who may wish to make any back bet, side bet or any other auxiliary bet (i.e., “backbettors”), may be permitted to use an auxiliary device 330 rather than go through the trouble of making conventional manual bets, placements, gestures or actions at an interactive gaming table 100. As will be readily appreciated, many backbettors may be permitted to make wagers or conduct other gaming activities with respect to a single active player or dealer, such as via multiple wireless access points at a given player position or station. Each backbettor may have his or her own handheld device, with each such device being adapted to communicate with the interactive gaming table via one or more access interfaces 331, which may be adapted for wireless communications. In some embodiments, there may be a one-to-one correspondence between auxiliary device 330 and access interface 331.

Methods of Use

Figure 6:
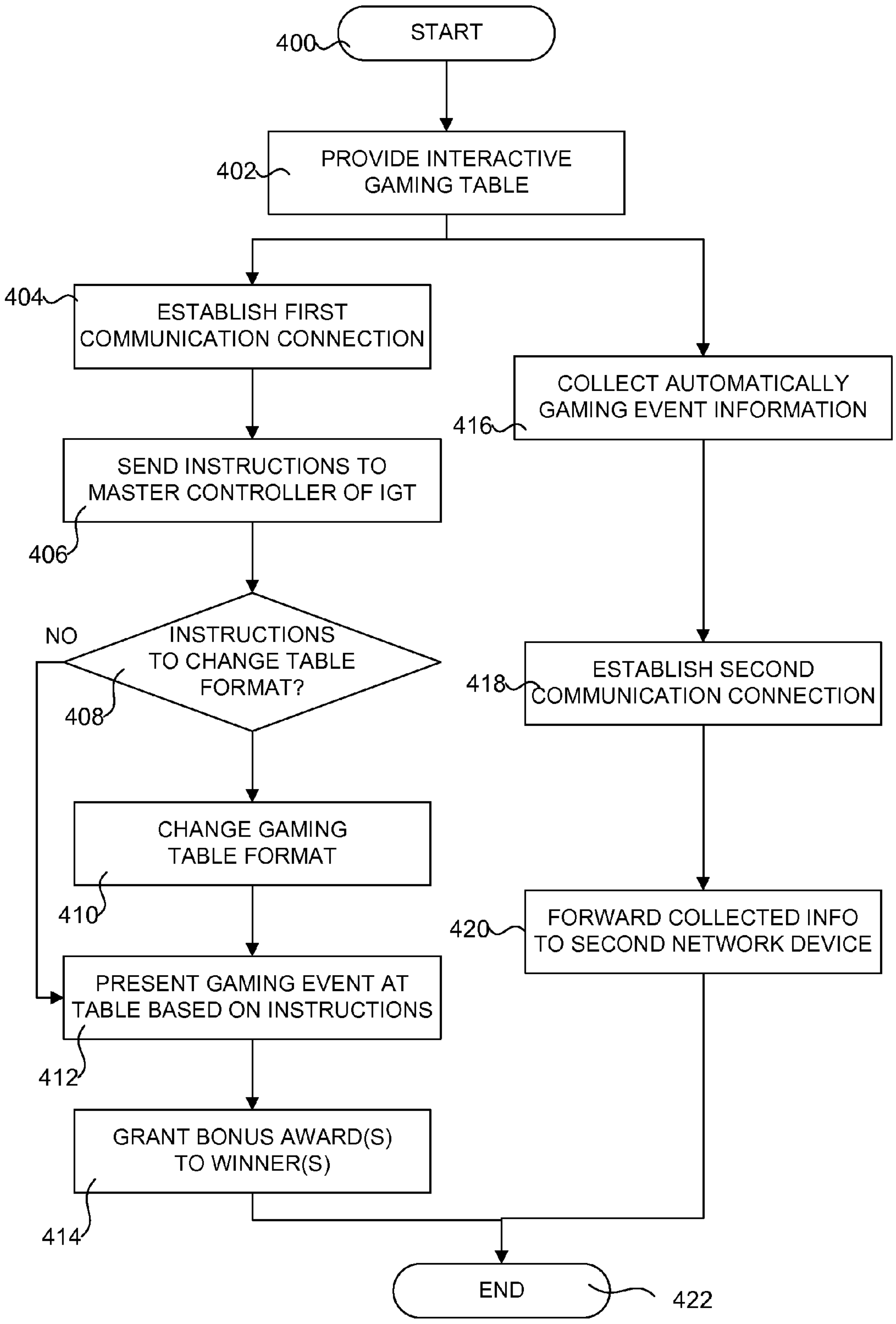
FIG. 6 illustrates a flowchart of an exemplary method of providing a gaming event across a plurality of networked interactive gaming tables according to one embodiment of the present invention.

Turning lastly to FIG. 6, a flowchart conveying an exemplary method of providing a gaming event across a plurality of networked interactive gaming tables according to one embodiment of the present invention is shown. While this flowchart may be comprehensive in some respects, it will be readily understood that not every step provided is necessary, that other steps can be included, and that the order of steps might be rearranged as desired by a given gaming operator. After start step 400, a first interactive gaming table is provided at a process step 402. While such an interactive gaming table can be substantially similar to those embodiments set forth above for interactive gaming table 100, it will also be understood that any suitable gaming table or other gaming venue similarly equipped and suited for the various peripherals and functionalities herein may also be provided.

At subsequent process step 404, a first communication connection is established between an access interface at the provided interactive gaming table and a first networked device. As noted above, such a networked device may be external and/or remote to the first interactive gaming table, and may be another interactive gaming table, a host server, a handheld device, or some other network component. At method step 406, instructions are then sent to the master gaming table controller of the interactive gaming table from the first networked device. Such instructions can be of a variety of types, such as, for example, instructions to play a particular type of table game, to coordinate games between tables, such as for a multi-table tournament, to facilitate player tracking or game auditing, to download and/or install or change various table items, such as a table surface layout, among other various possibilities.

The interactive gaming table may act on such instructions immediately or at some later time. As one example, such instructions could be to change a gaming table layout at the playing surface of the interactive gaming table. As such, a decision step 408 might need to be resolved as to whether the display atop the gaming table surface is to be changed from a first gaming format to a second gaming format. If such an instruction is to change table formats, then the method proceeds to step 410, where such a format may be changed. In any event, the method can then continue to a process step 412 to present a gaming event at the interactive gaming table based at least in part on the sent instructions. For example, where the instructions involved a command to change the gaming table layout from a blackjack table to a pai-gow poker table, a later presentation of a pai-gow game at the interactive gaming table would then comprise such a process step 412. After process step 412, a monetary payout or other prize is awarded to an active player at the interactive gaming table based on the presented gaming event at process step 414.

The provided method can also includes a process step 416 for collecting automatically game event information from the play of one or more table games at the interactive gaming table, after which a following process step 418 can involve establishing a second communication connection between an access interface at the table and a second networked device. Method step 420 then involves the forwarding of the game event information to the second networked device, which again could be a host server, another interactive gaming table, or some other external device. As noted above, such communications may be wireless or may also be wired. As also noted above, such communications may involve instructions sent from a host server, which instructions may be sent directly to the first interactive gaming table, or may be sent directly to a second interactive gaming table, which then relays the instructions to the first interactive gaming table. In the event that the first networked device is a player controlled auxiliary device, such instructions could involve a backbet command or data sent from a player backbetting with the auxiliary device.

After step 420, the method ends at end step 422. Again, various details and additional steps may similarly be included, and it is specifically contemplated that many variations of these exemplary methods may also be practiced. For example, as will be appreciated, many of the foregoing process steps may be grouped together in various ways. Because it may not be particularly important which order these various groups are performed in, these steps or groups are shown as being performed in parallel in FIG. 6. Other variations may also be used as desired by a particular gaming operator.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An interactive gaming table adapted for hosting table gaming events involving accepting wagers, playing table games based on the wagers and granting monetary awards based on the results of the table games, comprising:

a first surface adapted for the play of one or more wager-based table games and configured to automatically change a layout of the first surface from a first layout to a second layout;

an outer circumference adapted for the presence of one or more active players at said interactive gaming table, said outer circumference having a plurality of active player positions distributed thereabout;

a plurality of slave controller devices adapted to facilitate one or more table activities at said active player positions, wherein each of said plurality of active player positions includes at least one dedicated said slave controller device;

a master gaming table controller in communication with each of said plurality of slave controller devices and adapted to control a plurality of interactive gaming table functions, and also adapted to synchronize communications and activities between said plurality of slave controller devices;

at least one access interface in communication with said master gaming table controller and adapted for communications with one or more networked devices located away from said interactive gaming table;

one or more gaming table tracking devices in communication with said master gaming table controller and adapted to facilitate the tracking of one or more gaming events or transactions at said interactive gaming table; and a specialized gaming table bolster distributed about said outer circumference, said specialized gaming table bolster housing a plurality of bolster display devices adapted to indicate one or more status items regarding table game activities, the presence or absence of players, or both, at said interactive gaming table.

2. The interactive gaming table of claim 1, wherein each of said plurality of active player positions further includes:

a touchscreen in communication with a respective slave controller device selected from said plurality of slave controller devices and adapted to display visual information to an active player at said active player position;

a sound output device in communication with said respective slave controller device and adapted to display sound information to said active player;

a microphone in communication with said respective slave controller device and adapted to accept sound input from said active player;

a button panel having a plurality of buttons adapted to accept input from said active player; and a player tracking reader in communication with said respective slave controller device and adapted to read one or more identifying indicia assigned to said active player.

3. The interactive gaming table of claim 1, wherein said at least one access interface comprises a plurality of access interfaces in communication with said master gaming table controller and adapted to facilitate communications with one or more auxiliary devices located at or near said interactive gaming table.

4. The interactive gaming table of claim 3, wherein said master gaming table controller is adapted to administer automated backbetting on table games at said interactive gaming table via said plurality of access interfaces, wherein said backbetting is facilitated through backbettor use of said one or more auxiliary devices located at or near said interactive gaming table.

5. The interactive gaming table of claim 1, further including:

a player tracking reader at each of said plurality of active player positions distributed about said outer circumference, said player tracking reader being adapted to read one or more identifying indicia assigned to an active player.

6. The interactive gaming table of claim 5, wherein said one or more identifying indicia assigned to said active player comprises a player tracking card.

7. An interactive gaming table adapted for hosting table gaming events involving accepting wagers, playing table games based on the wagers and granting monetary awards based on the results of the table games, comprising:

an outer circumference adapted for the presence of one or more active players at said interactive gaming table, said outer circumference having a plurality of active player positions distributed thereabout;

a first surface adapted for the play of one or more wager-based table games and configured to automatically change a layout of the first surface from a first layout to a second layout;

one or more gaming table tracking devices adapted to facilitate the tracking of one or more gaming events or transactions associated with said one or more active players at said interactive gaming table; and at least one annunciator disposed thereupon and adapted to indicate one or more status items regarding main table game activities, the presence or absence of players, or both, at said interactive gaming table, wherein said at least one annunciator comprises a specialized gaming table bolster distributed about said outer circumference, said specialized gaming table bolster housing a plurality of bolster displays adapted to indicate said one or more status items.

8. The interactive gaming table of claim 7, wherein said plurality of bolster display devices includes at least one bolster light at each of said plurality of active player positions distributed about said outer circumference.

9. The interactive gaming table of claim 8, wherein said at least one bolster light at one or more of said plurality of active player positions comprises a light that covers substantially all of the bolster surface area for its respective active player position.

10. The interactive gaming table of claim 8, wherein said at least one bolster light at one or more of said plurality of active player positions is adapted to indicate whether its respective active player position is occupied by an active player or is open and available for a new player.

11. The interactive gaming table of claim 8, wherein said at least one bolster light at one or more of said plurality of active player positions is adapted to indicate whether it is the turn of an active player at its respective active player position.

12. The interactive gaming table of claim 8, wherein said at least one bolster light at one or more of said plurality of active player positions is adapted to indicate whether a winning game outcome has occurred for an active player at its respective active player position.

13. The interactive gaming table of claim 8, wherein said at least one bolster light at one or more of said plurality of active player positions is adapted to light up in a plurality of different colors, different patterns, or both, to indicate two or more different gaming table statuses selected from the group consisting of: whether its respective active player position is occupied by an active player or is open and available for a new player, whether it is the turn of an active player at its respective active player position, and whether a winning game outcome has occurred for an active player at its respective active player position.

14. The interactive gaming table of claim 7, wherein said plurality of bolster display devices includes a touchscreen at each of said plurality of active player positions distributed about said outer circumference.

15. The interactive gaming table of claim 7, further including:

at least one microphone and at least one sound output device at each of said plurality of active player positions distributed about said outer circumference.

16. The interactive gaming table of claim 7, further including:

one or more open plug in jacks at one or more of said plurality of active player positions distributed about said outer circumference, wherein said one or more open plug in jacks are adapted to permit an active player to plug in a personal electronic device and accept downloaded content from said interactive gaming table to said personal electronic device.

17. The interactive gaming table of claim 16, wherein said downloaded content comprises additional game related visual display items, sound display items, or both, for presentation on said personal electronic device.

18. The interactive gaming table of claim 16, wherein said downloaded content comprises advertising or promotional content for presentation on said personal electronic device.

19. The interactive gaming table of claim 7, wherein the layout is changed from the first layout to the second layout such that a different game can be played at said interactive gaming table.

20. The interactive gaming table of claim 5, wherein the layout is changed from a first active player position layout to a second active player position layout.

21. An interactive table gaming system, comprising:

a plurality of interactive gaming tables adapted for hosting table gaming events involving accepting wagers, playing table games based on the wagers and granting monetary awards based on the results of the table games, wherein each of said plurality of interactive gaming tables includes a first surface adapted for the play of one or more wager-based table games and configured to automatically change a layout of the first surface from a first layout to a second layout;

an outer circumference adapted for the presence of one or more active players at said interactive gaming table, said outer circumference having a plurality of active player positions distributed thereabout;

a master gaming table controller adapted to control a plurality of interactive gaming table functions and to communicate with one or more networked devices located away from its respective interactive gaming table;

at least one access interface in communication with said master gaming table controller and adapted for communications with said one or more networked devices; and one or more gaming table tracking devices in communication with said master gaming table controller and adapted to facilitate the tracking of one or more gaming events or transactions at its interactive gaming table; and a specialized gaming table bolster distributed about said outer circumference, said specialized gaming table bolster configured to house a plurality of bolster display devices adapted to indicate one or more status items regarding table game activities, the presence or absence of players, or both, at said interactive gaming table; and an interactive gaming table host server located remotely from at least one of said plurality of interactive gaming tables and in direct or indirect communication with each of said plurality of interactive gaming tables, said host server being adapted to synchronize coordinated gaming activities between at least two of said plurality of interactive gaming tables.

22. The interactive gaming table system of claim 21, wherein each of said plurality of active player positions further includes:

a touchscreen adapted to display visual information to an active player at said active player position;

a sound output device adapted to display sound information to said active player;

a microphone in communication with said respective slave controller device and adapted to display sound information to said active player; and a player tracking reader adapted to read one or more identifying indicia assigned to said active player.

23. The interactive gaming table system of claim 21, wherein said at least one access interface comprises a plurality of access interfaces in communication with said master gaming table controller, and further including:

a plurality of auxiliary devices adapted to accept player input regarding one or more gaming activities at one or more of said plurality of interactive gaming tables, wherein said plurality of access interfaces at said plurality of interactive gaming tables are adapted to facilitate communications with one or more of said plurality of auxiliary devices when said one or more auxiliary devices are located at or near a respective interactive gaming table.

24. The interactive gaming table system of claim 23, wherein at least one of said plurality of auxiliary devices is adapted to administer automated backbetting on table games at said interactive gaming table via at least one of said plurality of access interfaces, wherein said backbetting is facilitated through backbettor use of said at least one of said one or more auxiliary devices located at or near said interactive gaming table.

25. The interactive gaming table system of claim 23, wherein said plurality of access interfaces comprise a plurality of wireless access interfaces, and wherein said plurality of auxiliary devices include at least one handheld wireless device.

26. A method of providing a networked gaming event at an interactive gaming table adapted for hosting table gaming events involving accepting wagers, playing table games based on the wagers and granting monetary awards based on the results of the table games, comprising:

providing a first interactive gaming table adapted for hosting table gaming events involving wagers, the play of table games based on the wagers and monetary awards based on the results of the table games, said first interactive gaming table including a first surface adapted for the play of one or more wager-based table games, an outer circumference adapted for the presence of one or more active players, said outer circumference having a plurality of active player positions distributed thereabout, a master gaming table controller adapted to control a plurality of interactive gaming table functions and to communicate with one or more networked devices located away from said first interactive gaming table, at least one access interface in communication with said master gaming table controller and adapted for communications with said one or more networked devices and a specialized gaming table bolster distributed about said outer circumference, said specialized gaming table bolster configured to house a plurality of bolster display devices adapted to indicate one or more status items regarding table game activities, the presence or absence of players, or both, at said interactive gaming table;

establishing a first communication connection between said at least one access interface and a first networked device;

sending instructions to said master gaming table controller from said first networked device via said communication connection;

presenting a gaming event at said interactive gaming table based at least in part on said sent instructions;

awarding a prize or monetary payout to an active player at said interactive gaming table based on said gaming event;

collecting automatically game event information from the play of table games at said interactive gaming table;

establishing a second communication connection between said at least one access interface and a second networked and forwarding said game event information to said second networked device, wherein said sent instructions include instructions for changing a display atop said first surface from a first gaming formatted layout to a second different formatted gaming layout, and further including the step of: automatically changing said display atop said first surface from said first gaming formatted layout to said second different formatted gaming layout, such that a different table game can be played at said interactive gaming table.

27. The method of claim 26, wherein said at least one access interface comprises one or more wireless interfaces and wherein at least one of said first communication connection and said second communication connection is a wireless connection.

28. The method of claim 26, wherein said first networked device comprises an interactive gaming table host server located remotely from said first interactive gaming table.

29. The method of claim 26, wherein said first networked device comprises a second interactive gaming table adapted for hosting table gaming events involving wagers, the play of table games based on the wagers and monetary awards based on the results of the table games, said second interactive gaming table also including a surface adapted for the play of one or more wager-based table games, an outer circumference adapted for the presence of one or more active players, a master gaming table controller adapted to control a plurality of interactive gaming table functions and to communicate with one or more networked devices located away from said second interactive gaming table, and at least one access interface in communication with said master gaming table controller and adapted for communications with said one or more networked devices.

30. The method of claim 29, wherein a plurality of additional interactive gaming tables are adapted to communicate with said first gaming table.

31. The method of claim 29, further including the step of:

sending said instructions from an interactive gaming table host server located remotely from said first and second interactive gaming tables to said second interactive gaming table, wherein said step of sending instructions to said master gaming table controller from said first networked device involves said second interactive gaming table relaying said instructions from said gaming table host server to said first interactive gaming table.

32. The method of claim 26, wherein said first networked device comprises a player controlled auxiliary device adapted to accept and forward player input regarding one or more gaming activities at said first interactive gaming table.

33. The method of claim 32, wherein said sent instructions comprise instructions regarding a backbet of a player using said player controlled auxiliary device.

34. The method of claim 32, wherein said player controlled auxiliary device comprises a wireless device.

* * * * *